May 24, 1927.

T. J. LOFTUS 1,630,020

AUTOMATIC GOVERNING DEVICE FOR FLUID DISPLACEMENT METERS

Filed Oct. 7, 1925  2 Sheets-Sheet 1

INVENTOR.
Thomas J. Loftus
BY
Dewey, Strong, Townsend & Loftus
ATTORNEYS.

May 24, 1927. 1,630,020
T. J. LOFTUS
AUTOMATIC GOVERNING DEVICE FOR FLUID DISPLACEMENT METERS
Filed Oct. 7, 1925 2 Sheets-Sheet 2
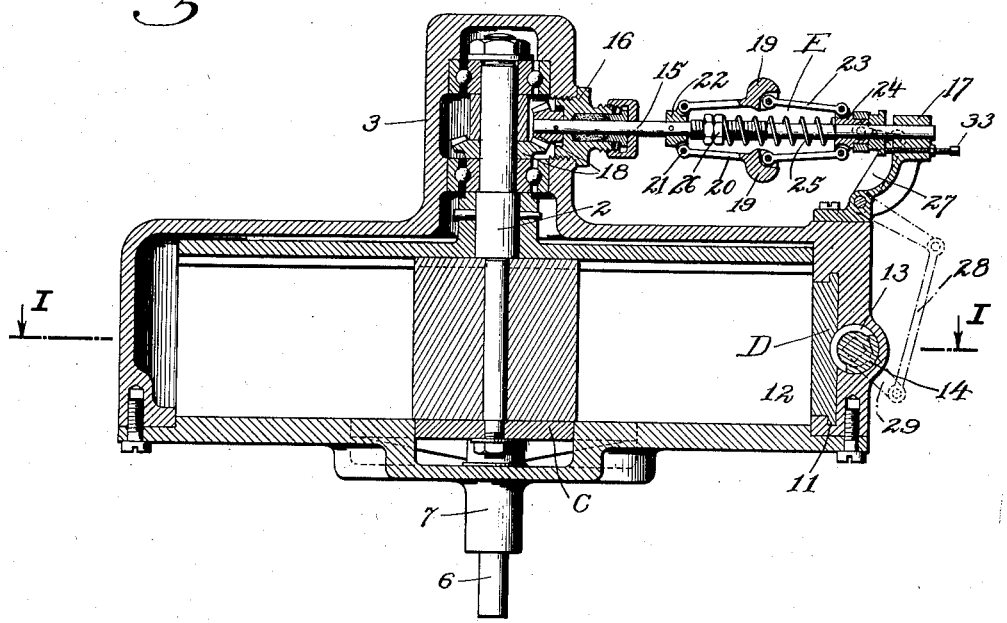
INVENTOR.
Thomas J. Loftus
BY
Davey, Strong, Townsend & Loftus
ATTORNEYS.

Patented May 24, 1927.

1,630,020

UNITED STATES PATENT OFFICE.

THOMAS J. LOFTUS, OF CASTELLA, CALIFORNIA, ASSIGNOR OF ONE-HALF TO HARMON BELL, OF OAKLAND, CALIFORNIA.

AUTOMATIC GOVERNING DEVICE FOR FLUID-DISPLACEMENT METERS.

Application filed October 7, 1925. Serial No. 60,977.

This invention relates to an automatic governing device for fluid displacement meters, and particularly to an improvement or attachment to the meter shown in my co-pending application entitled Device for pumping and measuring fluids, compressing gases, and like purposes, filed November 5, 1923, Serial No. 672,772.

The structure disclosed in my co-pending patent above referred to was especially intended for metering purposes; for instance, in the oil industry, for metering and dispensing gasoline and like products in measured quantities. Actual practice, however, proved that a certain amount of leakage would take place through the meter mechanism and thus accurate measurement could not be obtained at pre-determined speeds. Leakage loss during variable speed conditions could not be taken care of by manual adjustment of the cut-off valve, and the meter mechanism would, therefore, not function accurately under all conditions.

The object of the present invention is to overcome the objections above referred to by providing a governing device whereby the position of the cut-off valve is automatically adjusted for all speeds, thereby compensating for leakage losses regardless of speed variations or the quantity of fluid handled.

One form which my invention may assume is exemplified in the following description and illustrated in the accompanying drawings, in which—

Fig. 3 is a horizontal cross section taken on line III—III of Fig. 1, said view particularly illustrating the governor driving mechanism.

Fig. 4 is a plan view of Fig. 2.

Figure 1:
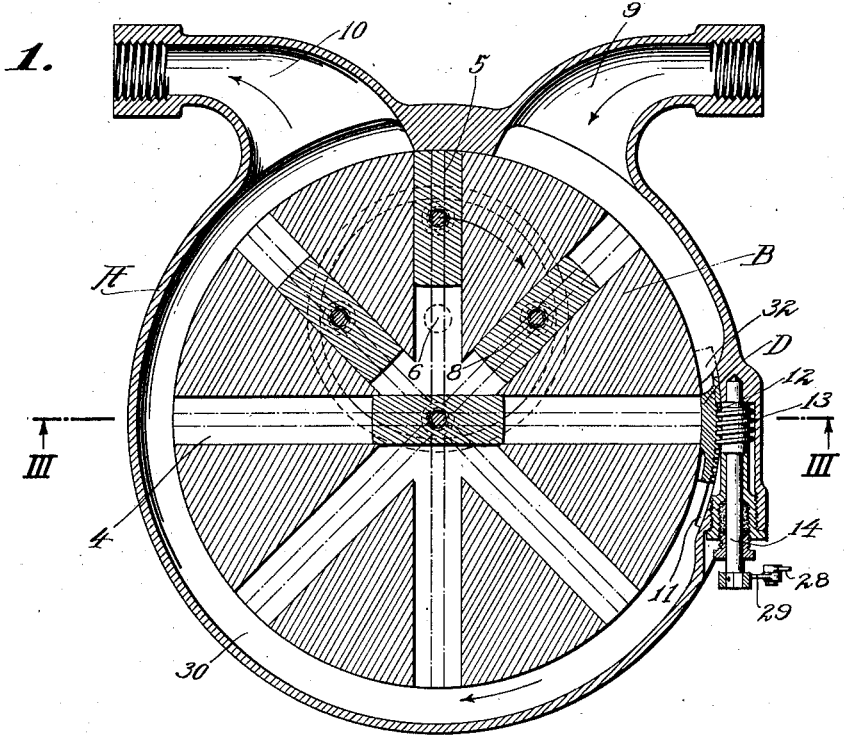
Fig. 1 is a central vertical section of the fluid meter taken on line I—I of Fig. 3.
Figure 2:
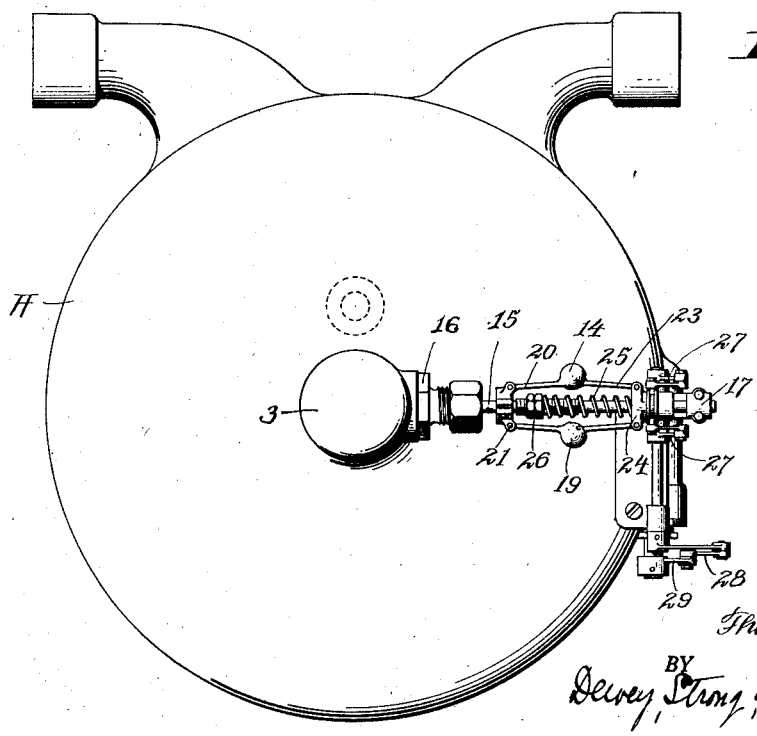
Fig. 2 is a side elevation of the meter showing the attachment of the governor whereby the cut-off valve is actuated.

The type of meter illustrated in the present instance is substantially identical with the type of meter illustrated in my co-pending application above referred to. Preferably, it consists of a cylindrical shaped casing A interior of which is mounted a rotor B. This rotor is secured to and supported by a shaft 2 which is journaled in a bearing 3 formed on one side of the casing. The rotor proper is radially slotted as indicated at 4. The slots extend from the periphery to the center of the rotor and the center portions communicate.

Slidably mounted in the slots are vanes 5 which serve the function of piston or displacement members. These vanes are carried by a second rotor generally indicated at C which is carried by a shaft 6 journaled in a bearing 7 formed in the opposite side of the casing. The shaft 6 and the rotor C are eccentrically positioned with relation to the rotor B and the rotor C is provided with a series of pins 8 which carry the vanes 5 and upon which they are pivotally mounted.

There are eight slots in the rotor in the present instance, and there are one-half as many vanes as there are slots. The number of vanes and slots employed may, however, be increased as desired, as long as the multiple of two is employed.

In view of the fact that the second rotor C is eccentrically positioned with relation to the main rotor B, it is necessary that the pins 8 which carry the vanes 5 be so positioned with relation to the center of the rotor that the center of the pins will pass through the center line of the rotor during turning movement of the mechanism.

The liquid to be metered or measured, for instance, gasoline, is admitted to the casing A through an inlet connection generally indicated at 9 and it is admitted under a slight pressure, say, for instance, a pressure which is sufficient to drive the rotors, the pressure actually required being slightly in excess of one pound pressure per square inch.

The liquid entering exerts its pressure on the outer ends of the vanes and as such forces the same inwardly and thereby causes rotation of the two rotors and transfer of the liquid from one side of the casing to the other where discharge connection 10 is accordingly provided. The vanes pass diametrically from one slot to another, as indicated by the horizontal position of one of the vanes in Fig. 1, during the rotation of the rotors, hence the necessity of providing twice as many slots as vanes.

In actual practice, it has been found that when the meter is operating under fairly low pressure and when the speed or rotation of the rotors is comparatively slow, that leakage of gasoline or other fluid will take place around the vanes and around the sides and ends of the rotors, and as such will enter the discharge connection 10 without being metered. To compensate for such leakage loss, a cut-off valve generally indicated at D is employed. This valve is segmental shaped and is mounted in the guideway 11 formed in the inner wall of the casing. One face is machined or ground to form a contact with the face of the rotor B while the other face is provided with worm teeth 12. These teeth are engaged by a worm pinion 13 secured on a shaft 14. This shaft is rotated in one direction or another by means of a governing mechanism generally indicated at E, as will hereinafter be described, to raise or lower the cut-off valve D as the speed of the rotors increase or decrease.

The governing mechanism consists of a shaft 15 journaled in the bearing members 16 and 17. The shaft 15 is driven through gears 18 from shaft 2, and the speed or rotation is accordingly always at a constant ratio to that of the shaft 2 and the rotors B and C.

An ordinary centrifugal type of governor, consisting of two weights or balls 19 is employed. These weights are carried by links 20 pivotally mounted as at 21 on a fixed collar 22. A second pair of links 23 are pivotally attached to the governor balls at one end and to a sliding collar 24 at the other end. The governor is normally maintained in contracted position by means of a spring 25 and this spring may be adjusted by means of nuts 26. A bell crank 27 is pivotally mounted on one end of the casing. One end of the bell crank is connected with the sliding collar 24 of the governor. The other end of the bell crank is connected through means of a link 28 with a crank arm 29 secured on the lower end of shaft 14. The operation will be as follows:

If a liquid or fluid under pressure is admitted through the intake connection 9, the vanes will be forced inwardly into the slots and will cause rotation of the rotors B and C. The liquid fills these slots, and as the slots filled with liquid pass the cut-off valve D it is transferred into an annular discharge chamber 30 which is in communication with the discharge connection 10. A continuous flow of liquid or fluid through the casing is thus obtained and continuous rotation of the metering mechanism is also insured.

When the quantity of liquid handled is fairly small and the pressure low, the speed or rotation will be comparatively slow and the leakage loss proportionately great. Such leakage loss is compensated for by advancing the cut-off valve to the dotted line position indicated at 32 (see Fig. 1). In other words, the cut-off valve shuts off the supply of gasoline to the slots before they have been completely filled, and a smaller quantity of gasoline is thus discharged into the discharge chamber 30. During slow revolution and low pressure conditions in a meter, the tension of the governor spring 25 is sufficient to prevent the governor from acting and the cut-off valve therefore maintains its most advanced position, this position being determined and regulated by a manually adjusted set screw 33 with which the sliding collar 24 of the governor contacts (see Fig. 3). On the other hand, if the pressure on the liquid is increased, the speed or rotation will be proportionately increased and a greater quantity of liquid will pass through the meter in the same period. The leakage loss remains, comparatively speaking, constant, but the amount of leakage in proportion to the quantity of liquid handled becomes smaller. It is, therefore, necessary to adjust the position of the cut-off valve, or, in other words, to slightly retract the same. This is automatically taken care of in the present instance by the governor as the speed of the shaft 15 will at that time be sufficient to slightly expand the governor and thereby impart a rocking movement to the bell crank 27, link 28, and crank arm 29. Such movement is transmitted to rotate the worm pinion 13 which engages the teeth 12 on the inner face of the cut-off valve. The cut-off valve is accordingly slightly retracted. Further retraction takes place if the speed of the rotors is increased. At maximum speed the cut-off valve is completely retracted as shown in full lines in Fig. 1. It is accordingly seen that the position of the cut-off valve is automatically determined by the speed of the metering mechanism, and that leakage losses are compensated for under all speed conditions.

The rotor B together with the vanes 5 are in reality nothing more nor less than a measuring mechanism, and as they are driven by the pressure of the fluid or liquid handled it is obvious that the speed will increase with an increase in pressure and decrease with a decrease in pressure. The speed of the rotor automatically changes the position of the cut-off valve. It might accordingly be stated that the valve position is automatically controlled by the speed of the rotor, or it may be stated that the change in pressure of fluid will automatically regulate the position of the cut-off valve, as the pressure regulates the speed of the measuring mechanism.

While the cut-off valve and automatic governor mechanism is here shown as applied to displacement meters of a specific character, it is obvious that they may be applied to numerous types of metering mechanism and that the invention is accordingly not limited to the particular application here shown.

Having thus described my invention, what

I claim and desire to secure by Letters Patent is—

1. A variable speed and discharge fluid meter comprising a housing, a movable measuring member mounted therein, a valve within the housing regulating the amount of fluid delivered to the measuring member, and means actuated by the speed of the measuring member for automatically changing the position of the valve with relation to said member to vary the amount of liquid delivered to the measuring member in inverse ratio to the speed of the measuring member.

2. A variable speed and discharge fluid meter comprising a housing, a rotatable member mounted therein provided with a plurality of measuring members, a valve within the housing regulating the amount of fluid delivered to each measuring member and having movement with relation thereto, and means actuated by the speed of the rotary measuring member for automatically changing the position of the valve with relation to the measuring member to vary the amount of liquid delivered to each measuring member in inverse ratio to the speed of the measuring member.

3. In a variable speed and discharge fluid meter, a housing, a rotatable metering member within the housing having a plurality of measuring pockets formed therein, means for admitting fluid under pressure to actuate the metering member, a valve within the housing adjustable for regulating the amount of liquid delivered to each measuring pocket, and means actuated by and positioned in accordance with the speed of the metering member for regulating the position of the valve.

4. In a variable speed discharge fluid meter, a housing, a rotating metering member having measuring pockets formed therein mounted within the housing, means for admitting a fluid under pressure to actuate the metering member, and means controlled by the rotation of said metering member whereby the amount of fluid entering each measuring pocket may be automatically regulated.

5. In a variable speed discharge fluid meter, a housing, a metering member having measuring pockets formed therein mounted within the housing, plungers reciprocally mounted in the metering pockets, means for admitting a fluid under pressure to the housing and to the measuring pockets to impart movement to the metering member and the plungers, a valve member within the housing adapted to regulate the amount of fluid delivered to each measuring pocket, and means actuated by the metering member in accordance with the speed thereof for imparting movement to said valve.

6. In a variable speed discharge fluid meter, a housing, a metering member having measuring pockets formed therein mounted within the housing, plungers reciprocally mounted in the metering pockets, means for admitting a fluid under pressure to the housing and to the measuring pockets to impart movement to the metering member and the plungers, a valve member within the housing adapted to regulate the amount of fluid delivered to each measuring pocket, a governor actuated by the metering member in accordance with the speed thereof, and a connection between the governor and the valve whereby the valve is moved to close the measuring pockets before the plungers reach the end of their stroke during high speed of the metering member and whereby the valve is moved in an opposite direction to retard closing of the pockets when the speed of the metering member is decreased.

THOMAS J. LOFTUS.